United States Patent [19]

Lenihan et al.

[11] Patent Number: 5,970,135
[45] Date of Patent: Oct. 19, 1999

[54] AUTOMATIC CALL DISTRIBUTOR WITH AGENT CONTROLLED CALL CONNECTION

[75] Inventors: John P. Lenihan, Plano, Tex.; Thomas S. Holtaway, Glen Ellyn, Ill.; Roger A. Sumner, Batavia, Ill.; Daniel F. Baker, Rolling Meadows, Ill.

[73] Assignee: Rockwell International Corporation, Costa Mesa, Calif.

[21] Appl. No.: 08/688,656

[22] Filed: Jul. 29, 1996

Related U.S. Application Data

[63] Continuation-in-part of application No. 08/361,253, Dec. 21, 1994, abandoned, which is a continuation-in-part of application No. 07/928,861, Aug. 11, 1992, abandoned.

[51] Int. Cl.⁶ .................................................. H04Q 3/64
[52] U.S. Cl. .................... 379/266; 379/113; 379/136; 379/142; 379/211; 379/265
[58] Field of Search .................... 379/265, 266, 379/309, 201, 210, 211, 212, 214, 112, 113, 121, 122, 133, 134, 139, 375, 252, 373, 142, 130, 131, 132, 135, 136

[56] References Cited

U.S. PATENT DOCUMENTS

| | | | |
|---|---|---|---|
| 4,694,483 | 9/1987 | Cheung | 379/112 |
| 4,757,529 | 7/1988 | Glapa et al. | 379/266 |
| 4,953,204 | 8/1990 | Cuschleg, Jr. et al. | 379/266 |
| 4,995,075 | 2/1991 | Angiolillo-Bent et al. | 379/375 |
| 5,008,884 | 4/1991 | Yazawa et al. | 370/384 |
| 5,023,868 | 6/1991 | Davidson et al. | 379/112 |
| 5,134,652 | 7/1992 | Brown et al. | 379/266 |
| 5,181,239 | 1/1993 | Jolissaint | 379/266 |
| 5,299,260 | 3/1994 | Shaio | 379/266 |
| 5,335,269 | 8/1994 | Steinlicht | 389/266 |
| 5,369,695 | 11/1994 | Chakravarti et al. | 379/211 |
| 5,432,846 | 7/1995 | Norio | 379/266 |
| 5,465,286 | 11/1995 | Clare et al. | 379/309 |

*Primary Examiner*—Scott Wolinsky
*Attorney, Agent, or Firm*—Welsh & Katz, Ltd.

[57] ABSTRACT

An automatic call distributor (12) having a device (10) for routing application telephone calls to any agent (20), a device (10) for routing an exterior position call directly to a particular agent (20), a device (10) for routing an interior position call directly to the particular agent (20), a device (10) for indicating the type of call being received among the application, external position, and internal position calls to the particular agent (20), and a device (10) for connecting the desired indicated call to the particular agent (20).

7 Claims, 1 Drawing Sheet

AUTOMATIC CALL DISTRIBUTOR WITH AGENT CONTROLLED CALL CONNECTION

BACKGROUND OF THE INVENTION

This application is a continuation-in-part of Ser. No. 08/361,253, filed Dec. 21, 1994, now abandoned, which is a continuation-in-part of application Ser. No. 07/928,861, filed Aug. 11, 1992, now abandoned.

The present invention relates to automatic calls distributors in a telephone system.

In the past, automatic call distributors (ACD) have been known to route calls to a number of agents in a telephone system. In such call distributors, the telephone system recognized application calls originating from the outside which are directed to any one of a plurality of agents on a basis when the agents are most available, and position calls which are made directly to a particular agent. However, no distinction has been made between position calls to the particular agent which originated outside the ACD and position calls which originated inside the ACD.

In todays complex business environment, it is important not only to support the standard ACD features and Service Representative selection, but to also be able to set features based on individual capabilities and job assignments of the agents. In many cases, highly trained professionals are now manning the ACD positions. Thus, it is essential that this individual be able to choose which incoming call type (application call, external position calls, or internal position calls) that they are going to handle first.

SUMMARY OF THE INVENTION

A feature of the present invention is the provision of an improved automatic call distributor with an agent controlled call connection The distributor of the present invention comprises, means for routing an application telephone call to an available agent, means for routing an exterior position call directly to a particular agent, and means for routing an interior position call directly to a particular agent.

A feature of the present invention is the provision of means for indicating the type of calls being received by the particular agent.

Yet another feature of the invention is the provision of means for connecting the desired indicated call to the particular agent.

Thus, a feature of the invention is that the distributor distributes the calls in an improved manner.

Another feature of the invention is that the particular agent may handle the calls in a desired priority allowing the agent to match their specialized characteristics with the call delivered.

A further feature of the invention is that the agent may select the application, exterior position, and internal position calls for handling by this agent.

Another feature of the invention is that the distributor transfers application calls from one agent to another agent responsive to the application call being unanswered within a predetermined period of time.

Still another feature of the invention is that the indicating means comprises a display.

Yet another feature of the invention is that the display indicates the type of call being received and the number of calls of each type.

Still another feature of the invention is that the indicating means may comprise means for supplying an audio signal responsive to a call.

A further feature of the invention is the provision of means for forwarding the exterior position and interior position calls from one agent to another agent.

Another feature of the invention is that the exterior and interior position calls may be placed in a waiting line for handling by the particular agent.

Further features will become more fully apparent in the following description of the embodiments of this invention, and from the appended claims.

DESCRIPTION OF THE PREFERRED EMBODIMENTS

Figure 1:
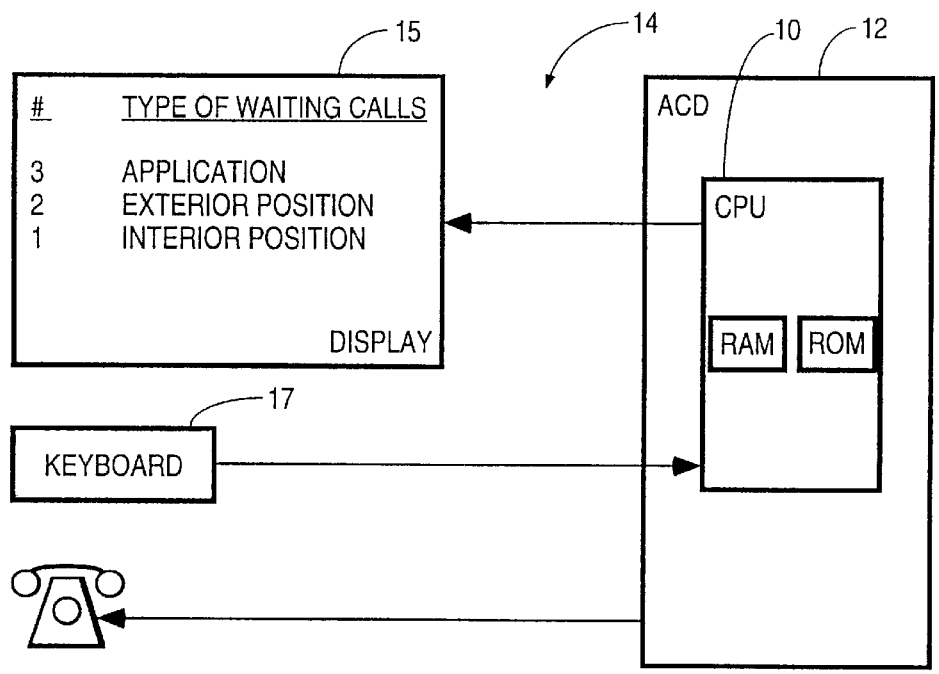
FIG. 1 is a block diagram of a telephone system including an automatic call distributor of the present invention.

Referring now to FIG. 1, there is shown a computer or Central Processing Unit (CPU) generally designated 10 for an Automatic Call Distributor (ACD) generally designated 12 in a telephone system generally designated 14. The CPU or computer 10 has a Random Access Memory (RAM) and a Read Only Memory (ROM), and a suitable program is filled into the memory of the computer 10 in order to control the ACD. The CPU may have a suitable display 15 for monitoring various calls in the telephone system 14, and a keyboard 17 for entering information into the computer 10.

Figure 2:
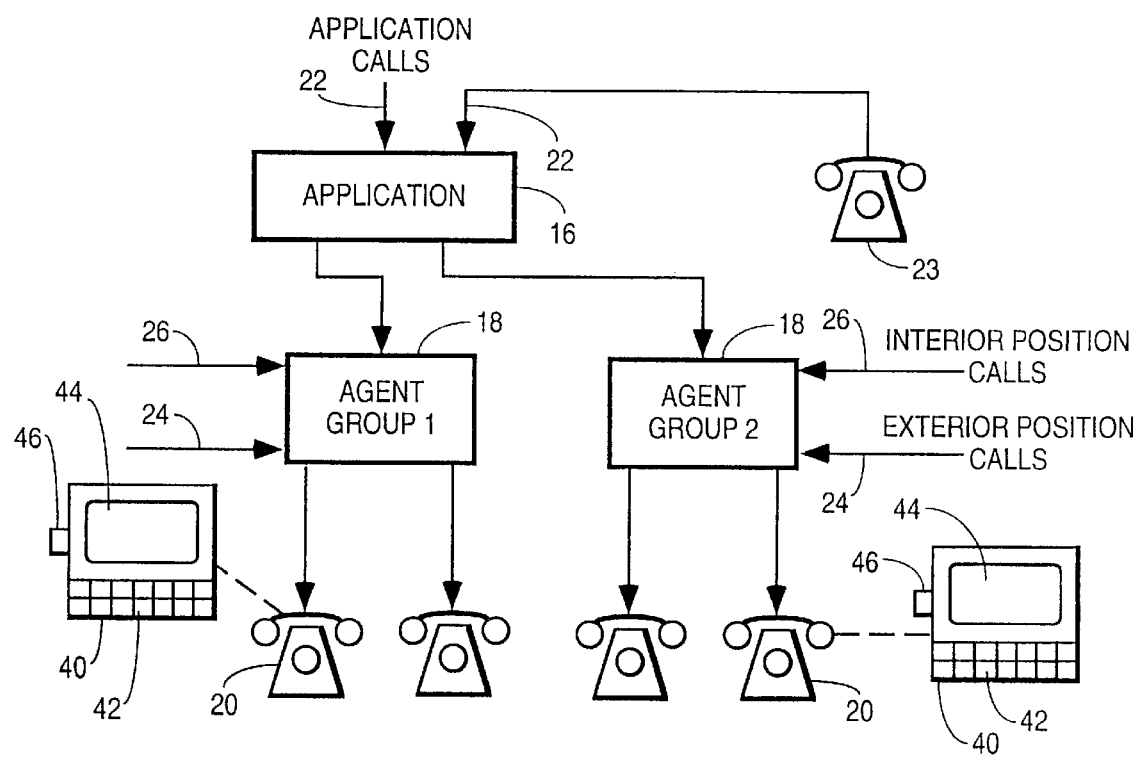
FIG. 2 is a block diagram of the automatic call distributor of the present invention.

With reference to FIG. 2, the ACD has an application 16 to receive and direct application or general incall calls 22 originating outside the ACD or inside from the telephone 23 to a plurality of agent groups 18, with the agent groups 18 further directing the application calls to a plurality of agents 20 corresponding to each of the agent groups 18. In the usual form, the application calls 22 are directed to the longest available agent 20 who is idle to handle the call, and the application calls 22 are also placed in a waiting line for handling by a particular agent until such time at which the agent 20 may handle the call, or the call may be transferred to a longest available agent 20 if the application call 22 is not answered in a predetermined period of time.

In addition, the telephone system 14 and ACD 12 may handle exterior position calls or direct inward dial calls (DID) 24 which originate from outside the ACD 12, and which are directed to a particular agent 20 handling the calls. The ACD 12 also handles interior position calls 26 which originate from one agent 20 within the ACD 12 to the particular agent 20. Thus, any agent 20 may receive in application call 22, an exterior position call 24, or an interior position call 26. Such calls are received and routed by the ACD 12 to the particular agent. The agents 20 may each have a control console 40 having a keyboard 42 and suitable display 44 for inputing data and displaying information to and from the computer 10 in connection with the various types of calls.

In accordance with the present invention, the computer 10 displays the type of calls, i.e., application, exterior position and interior position calls, received by the particular agent 20 on the display 44 of the agent's associated console 40. In addition, the computer 10 also displays the number of each of the type of calls on the display 44. The agent 20 may then select the type of call which is desired for handling by pressing a suitable key on the keyboard 42, and the selected call is then connected to the agent 20. The exterior position and interior position calls are also placed in a waiting line such that the agent 20 may answer these calls sequentially. In an alternative form, the computer 10 may sound a suitable audio device 46 to indicate this information to the agent 20.

The computer 10 may also be selected to forward the exterior position calls 24 and interior position calls 26 from the particular agent 20 to another agent 20. In this manner, the particular agent 20 may forward these calls when the particular agent 20 is unavailable, such as when the particular agent 20 is no longer on duty.

Thus, in accordance with the present invention, the telephone system 14 provides an indication of the types of calls being received by the agents 20, and permits the agents to select the particular calls. In this manner, the ACD operates in an improved and efficient manner while distributing the calls.

The foregoing detailed description has been given for clearness of understanding only, and no unnecessary limitations should be understood therefrom, as modifications will be obvious to those skilled in the art.

What is claimed is:

1. An agent controlled automatic call distributor, comprising:

means for placing application telephone calls on a waiting line associated with a particular agent;

means for placing exterior position telephone calls on a waiting line associated with the particular agent;

means for placing interior position telephone calls on a waiting line associated with the particular agent;

means for visually displaying to the particular agent each type of call and the number of calls of each type waiting to be served by the particular agent; and means for enabling the particular agent to select one of the calls to be connected to the particular agent.

2. The distributor of claim 1, wherein the application telephone calls are assigned a priority dependent upon the time of arrival of the application telephone calls.

3. The distributor of claim 2, further including means for transferring an application telephone call from one agent to another in response to the application telephone call being unanswered for a predetermined period of time.

4. The distributor of claim 1, wherein the application telephone calls are distributed among a plurality of agents.

5. The distributor of claim 1, further including means for determining the availability of the particular agent.

6. The distributor of claim 1, further including means for supplying an audio signal responsive to a call.

7. The distributor of claim 1, further including means for forwarding the exterior position and interior position calls from the particular agent to another agent.

* * * * *